US012794339B2

(12) United States Patent
Zhou et al.

(10) Patent No.: US 12,794,339 B2
(45) Date of Patent: Nov. 10, 2026

(54) FLYBACK CONVERTERS WITH IMPROVED PERFORMANCE AND THE CONTROL CIRCUIT THEREOF

(71) Applicant: Chengdu Monolithic Power Systems Co., Ltd., Chengdu (CN)

(72) Inventors: Xia Zhou, Hangzhou (CN); Xuefeng Chen, Hangzhou (CN); Hui Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 229 days.

(21) Appl. No.: 18/667,199

(22) Filed: May 17, 2024

(65) Prior Publication Data

US 2024/0388210 A1 Nov. 21, 2024

(30) Foreign Application Priority Data

May 19, 2023 (CN) ........................ 202310573494.1

(51) Int. Cl.
*H02M 3/335* (2006.01)
*H02M 1/00* (2006.01)

(52) U.S. Cl.
CPC ..... *H02M 1/0035* (2021.05); *H02M 3/33576* (2013.01); *H02M 3/33592* (2013.01); *H02M 1/0058* (2021.05); *H02M 3/33553* (2013.01)

(58) Field of Classification Search
CPC ......... H02M 3/33576; H02M 3/33592; H02M 1/0035; H02M 1/0032; H02M 3/33553
See application file for complete search history.

(56) References Cited

U.S. PATENT DOCUMENTS

| | | | | |
|---|---|---|---|---|
| 8,274,801 | B2 | 9/2012 | Shi et al. | |
| 11,356,030 | B2 | 6/2022 | Miao et al. | |
| 11,722,068 | B2 | 8/2023 | Li et al. | |
| 2009/0316441 | A1* | 12/2009 | Hu .................... | H02M 3/33592 363/21.06 |
| 2015/0103567 | A1* | 4/2015 | Wang ................ | H02M 3/33592 363/21.13 |
| 2015/0280573 | A1* | 10/2015 | Gong ................ | H02M 3/33592 363/21.14 |
| 2016/0181934 | A1* | 6/2016 | Kikuchi ............ | H02M 3/33523 363/21.14 |
| 2020/0036280 | A1* | 1/2020 | Yang ................. | H02M 3/33592 |
| 2022/0368236 | A1 | 11/2022 | Li et al. | |
| 2023/0058021 | A1 | 2/2023 | Liu | |
| 2024/0113629 | A1 | 4/2024 | Chen et al. | |

* cited by examiner

*Primary Examiner* — Alex Torres-Rivera
(74) *Attorney, Agent, or Firm* — Ashurst Perkins Coie US LLP

(57) ABSTRACT

A flyback converter with improved performance is discussed. The flyback converter may be nor may not be under a burst mode; or may exit from the burst mode. When the flyback converter is under a normal operation mode, the secondary power switch is turned on after the primary power switch is turned off, until an OFF condition of is met; and the secondary power switch is turned on again for an additional time before the primary power switch is turned on at a next switching cycle. When the flyback converter enters the burst mode and then exits from the burst mode, the secondary power switch is not turned on again for the additional time before a primary power switch's turn-on at the next switching cycle.

11 Claims, 3 Drawing Sheets

FLYBACK CONVERTERS WITH IMPROVED PERFORMANCE AND THE CONTROL CIRCUIT THEREOF

CROSS-REFERENCE TO RELATED APPLICATIONS

This application claims priority to and the benefit of Chinese Patent Application No. 202310573494.1, filed May 19, 2023, which is incorporated herein by reference in its entirety.

BACKGROUND OF THE INVENTION

Flyback converters are widely used in the applications of converting an alternate current (AC) into a direct current (DC). Typically, the flyback converter comprises: a transformer T having a primary winding T0 and a secondary winding T1, a primary switch Q0, a secondary switch Q1, and a voltage type snubber RCD, as shown in FIG. 1.

Zero-voltage switching technology is typically used in the flyback converter to reduce the switching loss of the primary switch. The so-called zero-voltage switching technology means that: the secondary switch Q1 will be turned on for an additional time after the freewheel process is over before the primary switch Q0 is turned on, or an auxiliary switch Q2 series coupled to an auxiliary winding T2 (as shown in FIG. 1 with dashed line) will be turned on for an additional time before the primary switch Q0 is turned on, to ensure the primary switch Q0 to be turned on with a zero drain-source voltage. A negative magnetic current would be generated at the primary side during this additional ON time, causing a large oscillation amplitude of the primary switch Q0 at the discontinuous current mode. Then the primary switch Q0 would have a relative low turn-on voltage.

However, the converter may enter a burst mode as the load of the converter decreases; and may exit the burst mode when the load increases. The voltage across the voltage type snubber RCD would decrease to a very low value during this period. If the secondary switch is turned on for an additional time before the primary switch is turned on, the current flowing through the secondary switch is large, resulting in a high output voltage ripple.

SUMMARY OF THE INVENTION

In accordance with an embodiment of the present invention, flyback converter is discussed. The flyback converter comprises: a primary power switch, a secondary power switch, and a control circuit. The primary power switch is coupled to a primary winding of a transformer. The secondary power switch is coupled to a secondary winding of the transformer. The control circuit is configured to provide a primary control signal and a secondary control signal, to respectively control the primary power switch and the secondary power switch to be periodically turned on and off under the control of the control circuit, to convert an input voltage into an output voltage. When the flyback converter is under a normal operation mode, the secondary power switch is turned on after the primary power switch is turned off, until an OFF condition of is met; then the secondary power switch is turned on again for an additional time before the primary power switch is turned on at a next switching cycle. When the flyback converter enters a burst mode and then exits from the burst mode, the secondary power switch is not turned on again for the additional time before a primary power switch's turn-on at the next switching cycle.

In addition, in accordance with an embodiment of the present invention, a control circuit used in a flyback converter is discussed. The control circuit comprises: a first controller, a delivery block, and a second controller. The first controller is configured to generate a secondary signal and a secondary control signal, wherein the secondary control signal is used to control a secondary power switch. The delivery block is configured to convert the secondary signal to a primary signal. The second controller is configured to generate a primary control signal used to control a primary power switch in response to the primary signal. When the flyback converter is under a normal operation mode, the first controller is configured to control the secondary power switch to be turned on after the primary power switch is turned off, until an OFF condition of is met; and control the secondary power switch to be turned on again for an additional time before the primary power switch is turned on at a next switching cycle. When the flyback converter enters a burst mode and then exits from the burst mode, the first controller is configured to control the secondary power switch to be not turned on again for the additional time before a primary power switch's turn-on at the next switching cycle.

Furthermore, in accordance with an embodiment of the present invention, a control circuit used in a flyback converter is discussed. The control circuit comprises: an error amplifier, a comparator, a first controller, a delivery block, and a second controller. The error amplifier is configured to amplify and integrate a difference between a feedback voltage indicative of an output voltage and a reference voltage, to generate a compensation signal. The comparator is error amplifier, configured to amplify and integrate a difference between a feedback voltage indicative of an output voltage and a reference voltage, to generate a compensation signal is configured to compare the compensation signal with a voltage threshold, to generate an indicative signal, wherein the indicative signal indicates the flyback converter to enter and/or exit a burst mode. The first controller is configured to generate a secondary signal and a secondary control signal in response to a signal indicative of a current flowing through the secondary power switch, the compensation signal and the indicative signal, wherein the secondary control signal is used to control a secondary power switch. The delivery block is configured to convert the secondary signal to a primary signal. The second controller is configured to generate a primary control signal used to control a primary power switch in response to the primary signal. When the flyback converter is under a normal operation mode, the first controller is configured to control the secondary power switch to be turned on after the primary power switch is turned off, until an OFF condition of is met; and control the secondary power switch to be turned on again for an additional time before the primary power switch is turned on at a next switching cycle. When the flyback converter enters a burst mode and then exits from the burst mode, the first controller is configured to control the secondary power switch to be not turned on again for the additional time before a primary power switch's turn-on at the next switching cycle.

DETAILED DESCRIPTION OF THE INVENTION

Embodiments of circuits for flyback converter are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
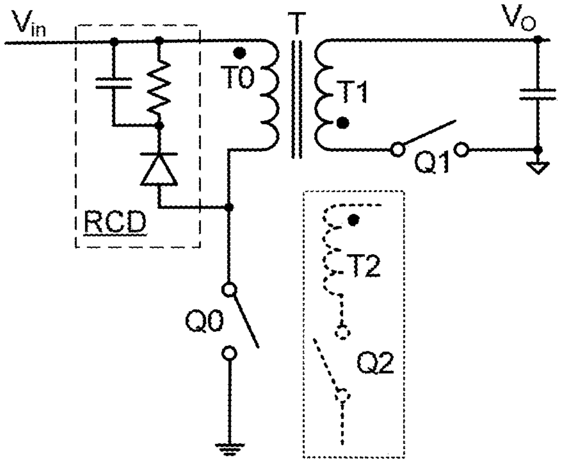
Figure 1 (Prior Art)
FIG. 1 schematically shows a circuit configuration of a typical flyback converter.
Figure 2:
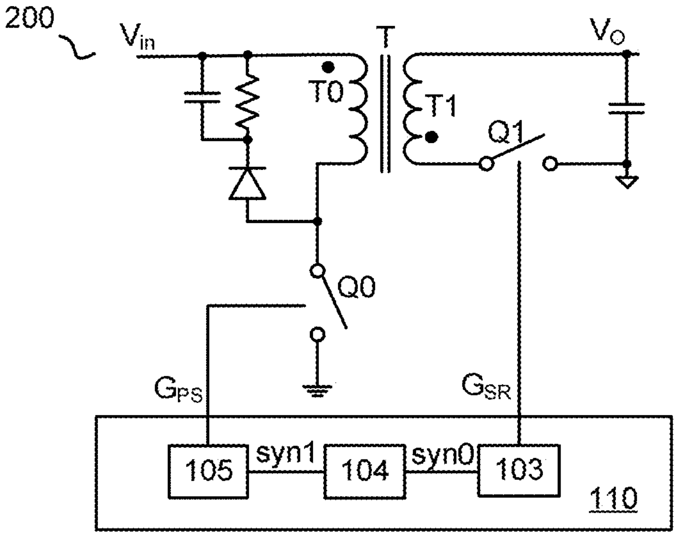
FIG. 2 schematically shows a flyback converter 200 in accordance with an embodiment of the present invention.

FIG. 2 schematically shows a flyback converter 200 in accordance with an embodiment of the present invention. In the example of FIG. 2, the flyback converter 200 comprises: a primary power switch Q0, coupled to a primary winding T0 of a transformer T; a secondary power switch Q1, coupled to a secondary winding T1 of the transformer T; and a control circuit 110, configured to provide a primary control signal $G_{PS}$ and a secondary control signal $G_{SR}$, to respectively control the primary power switch Q0 and the secondary power switch Q1. The primary power switch Q0 and the secondary power switch Q1 are controlled to be periodically turned on and off under the control of the control circuit 110, to convert an input voltage Vin into an output voltage $V_O$. When the flyback converter is under a normal operation mode (e.g., not under a burst mode operation, or not under a start-up stage, or under a fault condition, etc.), the secondary power switch Q1 is turned on after the primary power switch Q0 is turned off, until an OFF condition of is met; then the secondary power switch Q1 is turned on again for an additional time before the primary power switch Q0 is turned on at the next switching cycle. When the flyback converter enters the burst mode and then exits from the burst mode, the secondary power switch Q1 will not be turned on again for the additional time before the primary power switch Q0's turn-on at the next switching cycle.

In one embodiment of the present invention, the OFF condition comprises: a current flowing through the secondary power switch falls to a reference current (e.g., a value close to zero). For example, the secondary power switch Q1 may be turned off when a voltage across the secondary power switch Q1 reaches an OFF threshold.

In one embodiment of the present invention, the primary power switch Q0 and the secondary power switch Q1 are idle (i.e. the control circuit 110 would not control the primary power switch Q0 and the secondary power switch Q1 to switch between the ON and OFF states) during the burst mode.

In one embodiment of the present invention, the flyback converter 200 enters the burst mode as a load of the flyback converter decreases; and exits from the burst mode as the load increases. At a first one switching cycle just after exiting from the burst mode, the control circuit 110 does not control the secondary power switch Q1 to be turned on again for the additional time before the primary power switch Q0's turn-on at the next switching cycle. And after the first one switching cycle since the flyback converter exits from the burst mode, the control circuit 110 controls the secondary power switch Q1 to be turned on again for the additional time before the primary power switch Q0's turn-on at the next switching cycle. In other embodiments of the present invention, at the first N switching cycles just after the flyback converter exits from the burst mode, the control circuit 110 does not control the secondary power switch Q1 to be turned on again for the additional time before the primary power switch Q0's turn-on at the next switching cycle. And after the first N switching cycles since the flyback converter exits from the burst mode, the control circuit 110 controls the secondary power switch Q1 to be turned on again for the additional time before the primary power switch Q0's turn-on at the next switching cycle. N is an integer larger than 1.

In one embodiment of the present invention, a time length of the additional time that the secondary power switch Q1 is turned on again is determined by the input voltage and the output voltage. In other embodiments of the present invention, when the current flowing through the secondary power switch Q1 reaches a current threshold, the additional time is over (i.e., the secondary power switch Q1 is turned off).

In one embodiment of the present invention, the primary power switch Q0 and the secondary power switch Q1 may each comprise a mental oxide field effect transistor (MOSFET). However, one skilled in the art should realize that the primary power switch Q0 and the secondary power switch Q1 may comprise other controllable power devices, such as BJT, IGBT, GaN FET, SiC FET and cascode circuit (e.g., a cascade circuit of a JFET with a MOSFET).

Figure 3:
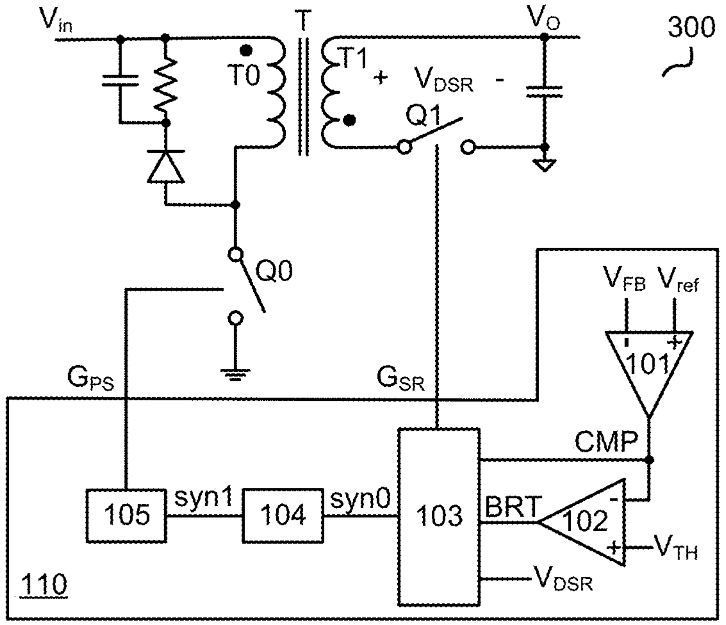
FIG. 3 schematically shows a flyback converter 300 with a circuit configuration of the controller 110 in accordance with an embodiment of the present invention.

FIG. 3 schematically shows a flyback converter 300 with a circuit configuration of the controller 110 in accordance with an embodiment of the present invention. Specifically, in the example of FIG. 3, the control circuit 110 comprises: an error amplifier 101, configured to amplify and integrate a difference between a feedback voltage $V_{FB}$ indicative of the output voltage $V_O$ and a reference voltage $V_{ref}$, to generate a compensation signal CMP; and a comparator (e.g. a hysteresis comparator) 102, configured to compare the compensation signal CMP with a voltage threshold $V_{TH}$, to generate an indicative signal BRT. The indicative signal BRT indicates the flyback converter 300 to enter and/or exit the burst mode. The control circuit 110 further comprises: a first controller 103, configured to generate a secondary signal syn0 and the secondary control signal $G_{SR}$ in response to a signal indicative of the current flowing through the secondary power switch Q1, the compensation signal CMP and the indicative signal BRT; a delivery block 104, configured to convert the secondary signal syn0 to a primary signal syn1; and a second controller 105, configured to generate the primary control signal $G_{PS}$. The signal indicative of the current flowing through the secondary power switch Q1 may comprise a voltage $V_{DSR}$ across the secondary power switch Q1.

In one embodiment of the present invention, the delivery block 104 may comprise an isolation capacitor. In other embodiments of the present invention, the delivery block 104 may comprise other isolation devices, such as optocoupler.

In one embodiment of the present invention, if the compensation signal CMP is lower than the voltage threshold $V_{TH}$, which means the output voltage is relatively low, the flyback converter 300 would enter the burst mode. If the load increases, the compensation signal CMP increases as well. When the compensation signal CMP increases to be higher than a sum of the voltage threshold $V_{TH}$ and a hysteresis value of the comparator 102, the flyback converter 300 would exit the burst mode.

In one embodiment of the present invention, the first controller 103 is configured to generate the secondary control signal $G_{SR}$ in response to the voltage $V_{DSR}$ across the secondary power switch Q1. For example, when the voltage $V_{DSR}$ across the secondary power switch Q1 is lower than an ON threshold, the first controller 103 is operable to turn on the secondary power switch Q1. When the voltage $V_{DSR}$ across the secondary power switch Q1 is higher than an OFF threshold, the first controller 103 is operable to turn off the secondary power switch Q1. Then if the indicative signal BRT indicates the flyback converter 300 operates at a normal operation (i.e., does not enter the burst mode), the first controller 103 controls the secondary power switch Q1 to be turned on again for the additional time in response to the compensation signal CMP. Meanwhile, the first controller 103 is operable to send the secondary signal syn0 to the primary side via the delivery block 104, to turn on the primary power switch Q0. Consequently, a new switching cycle starts. If the indicative signal BRT indicates that the flyback converter 300 has entered the burst mode, the first controller 103 controls the secondary power switch Q1 to be idle; and sends the corresponding secondary signal syn0 (e.g., with logical low level) to the primary side via the delivery block 104, so that the primary power switch Q0 would be also idle. If the indicative signal BRT indicates the flyback converter 300 has exited from the burst mode, the first controller 103 directly sends the secondary signal syn0 to the primary side via the delivery block 104 in response to the compensation signal CMP, so that the second controller 105 is operable to control the primary power switch Q0.

Specifically speaking, if the flyback converter does not enter the burst mode, when the compensation signal CMP indicates that the primary power switch Q0 is to be turned on, the secondary power switch Q1 is controlled to be turned on again for the additional time, to achieve zero-voltage switching. Meantime, the secondary signal syn0 with logical high level is sent to the primary side via the delivery block 104, so as to turn on the primary power switch Q0. If the flyback converter enters the burst mode and then exits from the burst mode, when the compensation signal CMP indicates that the primary power switch Q0 is to be turned on, the secondary power switch Q1 will not be turned on again for the additional time. That is, the second turn-on of the secondary power switch is blanked. Thus, the zero-voltage switching is blanked. The secondary signal syn0 with logical high level is sent to the primary side via the delivery block 104, so as to turn on the primary power switch Q0.

In one embodiment of the present invention, if the indicative signal BRT indicates the flyback converter 300 exits from the burst mode, the first controller 103 directly sends the secondary signal syn0 with the logical high level to the primary side via the delivery block 104 in response to the compensation signal CMP, so that the second controller 105 is operable to turn on the primary power switch Q1 at the first N switching cycle just after exiting the burst mode.

At the primary side, the primary power switch Q0 is controlled to be idle or to be turned on under the control of the second controller 105. After the turn-on of the primary power switch Q0, the second controller 105 may be operable to turn off the primary power switch Q0 in response to a current flowing through the primary power switch Q0. For example, when the current flowing through the primary power switch Q0 reaches to a current threshold, which is known as the peak current control to one skilled in the art. The second controller 105 may also be operable to turn off the primary power switch Q0 when an ON time length of the primary switch Q0 reaches to a certain time length.

Figure 4:
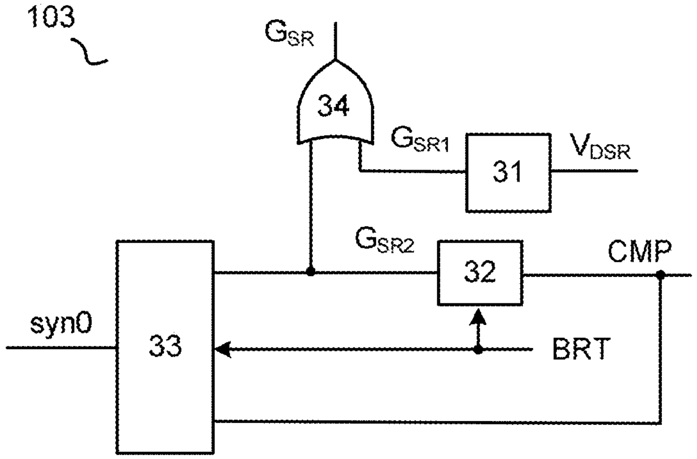
FIG. 4 schematically shows a circuit configuration of the first controller 103 in accordance with an embodiment of the present invention.

FIG. 4 schematically shows a circuit configuration of the first controller 103 in accordance with an embodiment of the present invention. In the example of FIG. 4, the first controller 104 comprises: a first signal generator 31, a second signal generator 32, and a select circuit 33. The first signal generator 31 is configured to generate a first control signal $G_{SR1}$ in response to a signal $V_{DSR}$ indicative of the current flowing through the secondary power switch Q1, to control a freewheeling of the secondary power switch Q1. The second signal generator 32 is configured to generate a second control signal $G_{SR2}$ in response to the compensation signal CMP and the indicative signal BRT. The select circuit 33 is configured to select the second control signal $G_{SR2}$ or the compensation signal CMP (i.e. select between the second control signal $G_{SR2}$ and the compensation signal CMP) as the second signal syn0 in response to the indicative signal BRT.

When the indicative signal BRT indicates the flyback converter does not enter the burst mode, the second signal generator 32 generates the second control signal $G_{SR2}$ in response to the compensation signal, to control the secondary power switch Q1 to be turned on again for the additional time before the primary power switch Q0 is turned on at next switching cycle.

In the example of FIG. 4, the first controller 103 further comprises: a logical OR circuit 34, configured to perform a logical OR operation on the first control signal $G_{SR1}$ and the second control signal $G_{SR2}$, to generate the secondary control signal $G_{SR}$, to control the secondary power switch Q1.

Figure 5:
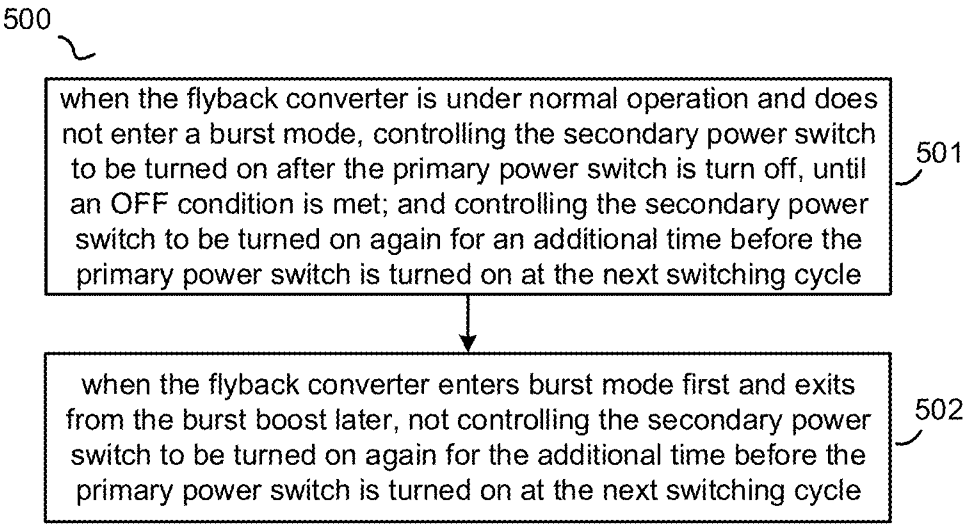
FIG. 5 schematically shows a flowchart 500 of a method used in a flyback converter 500 in accordance with an embodiment of the present invention.

FIG. 5 schematically shows a flowchart 500 of a method used in a flyback converter in accordance with an embodiment of the present invention. The flyback converter includes a primary power switch and a secondary power switch, controlled to be turned on and off periodically, to convert an input voltage to an output voltage. The method comprises:

Step 501, when the flyback converter is under normal operation and does not enter a burst mode, controlling the secondary power switch to be turned on after the primary power switch is turn off, until an OFF condition is met; and controlling the secondary power switch to be turned on again for an additional time before the primary power switch is turned on at the next switching cycle. In one embodiment of the present invention, the OFF condition comprises: a current flowing through the secondary power switch falls to a reference current. And Step 502, when the flyback converter enters burst mode first and exits from the burst mode later, not controlling the secondary power switch to be turned on again for the additional time before the primary power switch is turned on at the next switching cycle.

In one embodiment of the present invention, the method further comprises: controlling the primary power switch and the secondary power switch to be idle when the flyback converter is under the burst mode.

In one embodiment of the present invention, at the first one switching cycle just after the flyback exits from the burst mode, not controlling the secondary power switch to be turned on again for the additional time before the primary power switch's turn-on at the next switching cycle; and after the first one switching cycle since the flyback converter exits from the burst mode, controlling the secondary power switch to be turned on again for the additional time before the primary power switch's turn-on at the next switching cycle.

In one embodiment of the present invention, at the first N switching cycles just after the flyback exits from the burst mode, not controlling the secondary power switch to be turned on again for the additional time before the primary power switch's turn-on at the next switching cycle; and after the first N switching cycles since the flyback converter exits from the burst mode, controlling the secondary power switch to be turned on again for the additional time before the primary power switch's turn-on at the next switching cycle.

In one embodiment of the present invention, the method further comprises: amplifying and integrating a difference between a feedback voltage indicative of the output voltage and a reference voltage, to generate a compensation signal; and comparing the compensation signal with a voltage threshold, to generate an indicative signal. The indicative signal indicates the flyback converter to enter and/or exit the burst mode.

Several embodiments of the foregoing flyback converter do not turn on the secondary power switch again for an additional time when the system exits from the burst mode and directly turn on the primary power switch. Thus, the voltage ripple caused by the large voltage droop of the voltage across the RCD snubber is prevented; and the system performance is improved.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A flyback converter, comprising:

a primary power switch, coupled to a primary winding of a transformer;

a secondary power switch, coupled to a secondary winding of the transformer; and a control circuit, configured to provide a primary control signal and a secondary control signal, to respectively control the primary power switch and the secondary power switch to be periodically turned on and off under a control of the control circuit, to convert an input voltage into an output voltage; wherein:

when the flyback converter is under a normal operation mode, the secondary power switch is turned on after the primary power switch is turned off, until an OFF condition of is met; then the secondary power switch is turned on again for an additional time before the primary power switch is turned on at a next switching cycle; and when the flyback converter enters a burst mode and then exits from the burst mode, the secondary power switch is not turned on again for the additional time before a primary power switch's turn-on at the next switching cycle; and wherein at first N switching cycles just after the flyback converter exits from the burst mode, the control circuit is configured to not control the secondary power switch to be turned on again for the additional time before the primary power switch's turn-on at the next switching cycle; and after the first N switching cycles since the flyback converter exits from the burst mode, the control circuit is configured to control the secondary power switch to be turned on again for the additional time before the primary power switch's turn-on at the next switching cycle; and wherein N is an integer larger than 0.

2. The flyback converter of claim 1, wherein:

the primary power switch and the secondary power switch are idle when the flyback converter is under the burst mode.

3. The flyback converter of claim 1, wherein the control circuit comprises:

an error amplifier, configured to amplify and integrate a difference between a feedback voltage indicative of the output voltage and a reference voltage, to generate a compensation signal;

a comparator, configured to compare the compensation signal with a voltage threshold, to generate an indicative signal, wherein the indicative signal indicates the flyback converter to enter and/or exit the burst mode;

a first controller, configured to generate a secondary signal and the secondary control signal in response to the compensation signal, the indicative signal, and a signal indicative of a current flowing through the secondary power switch;

a delivery block, configured to convert the secondary signal to a primary signal; and a second controller, configured to generate the primary control signal in response to the primary signal.

4. The flyback converter of claim 3, wherein the first controller comprises:

a first signal generator, configured to generate a first control signal in response to the signal indicative of the current flowing through the secondary power switch, to control a freewheeling of the secondary power switch;

a second signal generator, configured to generate a second control signal in response to the compensation signal and the indicative signal; and a select circuit, configured to select the second control signal or the compensation signal as the second signal in response to the indicative signal.

5. A control circuit used in a flyback converter, comprising:

a first controller, configured to generate a secondary signal and a secondary control signal, wherein the secondary control signal is used to control a secondary power switch;

a delivery block, configured to convert the secondary signal to a primary signal; and a second controller, configured to generate a primary control signal used to control a primary power switch in response to the primary signal; wherein:

when the flyback converter is under a normal operation mode, the first controller is configured to control the secondary power switch to be turned on after the primary power switch is turned off, until an OFF condition of is met; and control the secondary power switch to be turned on again for an additional time before the primary power switch is turned on at a next switching cycle; and when the flyback converter enters a burst mode and then exits from the burst mode, the first controller is configured to control the secondary power switch to be not turned on again for the additional time before a primary power switch's turn-on at the next switching cycle; and wherein at first N switching cycles just after the flyback converter exits from the burst mode, the control circuit is configured to not control the secondary power switch to be turned on again for the additional time before the primary power switch's turn-on at the next switching cycle; and after the first N switching cycles since the flyback converter exits from the burst mode, the control circuit is configured to control the secondary power switch to be turned on again for the additional time before the primary power switch's turn-on at the next switching cycle; and wherein N is an integer larger than 0.

6. The control circuit of claim 5, further comprising:

an error amplifier, configured to amplify and integrate a difference between a feedback voltage indicative of an output voltage and a reference voltage, to generate a compensation signal; and a comparator, configured to compare the compensation signal with a voltage threshold, to generate an indicative signal, wherein the indicative signal indicates the flyback converter to enter and/or exit the burst mode.

7. The control circuit of claim 6, wherein the first controller comprises:

a first signal generator, configured to generate a first control signal in response to a signal indicative of a current flowing through the secondary power switch, to control a freewheeling of the secondary power switch;

a second signal generator, configured to generate a second control signal in response to the compensation signal and the indicative signal; and a select circuit, configured to select the second control signal or the compensation signal as the second signal in response to the indicative signal.

8. The control circuit of claim 5, wherein the delivery circuit comprises:

an isolation capacitor.

9. A control circuit used in a flyback converter, comprising:

an error amplifier, configured to amplify and integrate a difference between a feedback voltage indicative of an output voltage and a reference voltage, to generate a compensation signal;

a comparator, configured to compare the compensation signal with a voltage threshold, to generate an indicative signal, wherein the indicative signal indicates the flyback converter to enter and/or exit a burst mode;

a first controller, configured to generate a secondary signal and a secondary control signal in response to a signal indicative of a current flowing through the secondary power switch, the compensation signal and the indicative signal, wherein the secondary control signal is used to control a secondary power switch;

a delivery block, configured to convert the secondary signal to a primary signal; and a second controller, configured to generate a primary control signal used to control a primary power switch in response to the primary signal; wherein:

when the flyback converter is under a normal operation mode, the first controller is configured to control the secondary power switch to be turned on after the primary power switch is turned off, until an OFF condition of is met; and control the secondary power switch to be turned on again for an additional time before the primary power switch is turned on at a next switching cycle; and when the flyback converter enters a burst mode and then exits from the burst mode, the first controller is configured to control the secondary power switch to be not turned on again for the additional time before a primary power switch's turn-on at the next switching cycle; and wherein at first N switching cycles just after the flyback converter exits from the burst mode, the control circuit is configured to not control the secondary power switch to be turned on again for the additional time before the primary power switch's turn-on at the next switching cycle; and after the first N switching cycles since the flyback converter exits from the burst mode, the control circuit is configured to control the secondary power switch to be turned on again for the additional time before the primary power switch's turn-on at the next switching cycle; and wherein N is an integer larger than 0.

10. The control circuit of claim 9, wherein the first controller comprises:

a first signal generator, configured to generate a first control signal in response to a signal indicative of a current flowing through the secondary power switch, to control a freewheeling of the secondary power switch;

a second signal generator, configured to generate a second control signal in response to the compensation signal and the indicative signal; and a select circuit, configured to select the second control signal or the compensation signal as the second signal in response to the indicative signal.

11. The control circuit of claim 9, wherein the delivery circuit comprises:

an isolation capacitor.

* * * * *